United States Patent
Yu et al.

(10) Patent No.: US 11,887,299 B2
(45) Date of Patent: Jan. 30, 2024

(54) IMAGE PROCESSING SYSTEM AND IMAGE PROCESSING METHOD

(71) Applicants: Acer Incorporated, New Taipei (TW); National Taiwan University Hospital, Taipei (TW)

(72) Inventors: Chun-Hsien Yu, New Taipei (TW); Jehn-Yu Huang, Taipei (TW); Cheng-Tien Hsieh, New Taipei (TW); Yun-Ting Lin, New Taipei (TW)

(73) Assignees: ACER INCORPORATED, New Taipei (TW); NATIONAL TAIWAN UNIVERSITY HOSPITAL, Taipei (TW)

( * ) Notice: Subject to any disclaimer, the term of this patent is extended or adjusted under 35 U.S.C. 154(b) by 365 days.

(21) Appl. No.: 17/191,909

(22) Filed: Mar. 4, 2021

(65) Prior Publication Data

US 2022/0164947 A1   May 26, 2022

(30) Foreign Application Priority Data

Nov. 26, 2020   (TW) .................................. 109141552

(51) Int. Cl.
  G06K 9/00   (2022.01)
  G06T 7/00   (2017.01)
  (Continued)

(52) U.S. Cl.
  CPC ............. G06T 7/0012 (2013.01); G06N 3/08 (2013.01); G06T 7/10 (2017.01);
  (Continued)

(58) Field of Classification Search
  None
  See application file for complete search history.

(56) References Cited

U.S. PATENT DOCUMENTS

2017/0112372 A1 * 4/2017 Chakravorty ........ A61B 3/1241
2018/0140180 A1   5/2018 Coleman
(Continued)

FOREIGN PATENT DOCUMENTS

CN   110992382 A     4/2020
CN   111724381 A *   9/2020   ............ G06T 5/002
(Continued)

OTHER PUBLICATIONS

Search Reports of its corresponding EP application No. 109130883 dated Sep. 21, 2021.
(Continued)

*Primary Examiner* — Wei Wen Yang
(74) *Attorney, Agent, or Firm* — McClure, Qualey & Rodack, LLP

(57) ABSTRACT

An image processing system includes an ophthalmoscope device and a processor. The ophthalmoscope device is configured to obtain a color fundus image. The processor is configured to receive the color fundus image; generate a blood vessel segmentation image that corresponds to the color fundus image using a computer vision algorithm or a deep learning model; preprocess the color fundus image and the blood vessel segmentation image to obtain an initial input image; and input the initial input image into a convolutional neural network. The convolutional neural network outputs a value. In addition, the processor generates fundus image analysis information from the cup-to-disc ratio and the value.

20 Claims, 8 Drawing Sheets

(51) Int. Cl.
   *G06T 7/10*       (2017.01)
   *G06N 3/08*       (2023.01)
(52) U.S. Cl.
   CPC .............. *G06T 2207/10024* (2013.01); *G06T 2207/10101* (2013.01); *G06T 2207/20081* (2013.01); *G06T 2207/20084* (2013.01); *G06T 2207/30041* (2013.01); *G06T 2207/30101* (2013.01)

(56) References Cited

U.S. PATENT DOCUMENTS

| | | | |
|---|---|---|---|
| 2020/0288972 A1* | 9/2020 | Park | G06N 99/00 |
| 2021/0158525 A1* | 5/2021 | Iwase | G06T 7/97 |
| 2022/0007935 A1* | 1/2022 | Minamide | A61B 5/4893 |

FOREIGN PATENT DOCUMENTS

| | | | | |
|---|---|---|---|---|
| CN | 111863241 A | | 10/2020 | |
| JP | 2020093076 A | * | 6/2020 | ........... A61B 3/0025 |

OTHER PUBLICATIONS

Optic Disc and Cup Segmentation with Blood Vessel Removal from Fundus Images for Glaucoma Detection; Oct. 26, 2018.

* cited by examiner

IMAGE PROCESSING SYSTEM AND IMAGE PROCESSING METHOD

CROSS REFERENCE TO RELATED APPLICATIONS

This application claims priority of Taiwan Patent Application No. 109141552, filed on Nov. 26, 2020, the entirety of which is incorporated by reference herein.

BACKGROUND OF THE INVENTION

Field of the Invention

The present invention relates to a processing system, and in particular to an image processing system and an image processing method applied to the analysis of fundus images.

Description of the Related Art

Glaucoma is the second-leading cause of blindness in Taiwan and the United States, and only about one-third of patients realize that they have glaucoma and go for a diagnosis. The way to diagnose glaucoma is to use ophthalmology optical coherence Tomography (OCT) to obtain the image of the retinal nerve fiber layer (BNFL) thickness.

However, most people do not deliberately photograph optical coherence tomography images, as the cost of optical coherence tomography is high and the equipment difficult to obtain, whereas color fundus images are relatively easy to obtain.

Therefore, how to use a cheaper and more convenient method to assist doctors in interpreting color fundus images has become one of the problems to be solved in this field.

BRIEF SUMMARY OF THE INVENTION

In order to solve the above-mentioned problems, one aspect of the present disclosure provides an image processing system. The image processing system includes an ophthalmoscope device and a processor. The ophthalmoscope device is configured to obtain a color fundus image. The processor is configured to receive the color fundus image; generate a blood vessel segmentation image that corresponds to the color fundus image using a computer vision algorithm or a deep learning model; preprocess the color fundus image and the blood vessel segmentation image to obtain an initial input image; and input the initial input image into a convolutional neural network. The convolutional neural network outputs a value. In addition, the processor generates fundus image analysis information from the cup-to-disc ratio and the value.

Another aspect of the present invention is to provide an image processing method. The steps of the image processing method include: locating the optic disc image in the color fundus image, cropping the optic disc image; inputting the optic disc image into a first deep learning segmentation network, outputting a neural disc semantic analysis image from the first deep learning segmentation network; inputting the optic disc image into a second deep learning segmentation network, outputting a neural cup semantic analysis image from the second deep learning segmentation network; and dividing the white area in the neural disc semantic analysis image by the white area in the neural cup semantic analysis image to obtain the cup-to-disc ratio.

The image processing system and image processing method shown in the present invention can analyze the color fundus images to calculate the cup-to-disc ratio and the probability of optic nerve defects, and use the fundus image analysis information to assist doctors in the use of color fundus images for glaucoma judgment. For example, when the doctor sees that the cup-to-disc ratio falls within the range of normal human eyes, and the probability of optic nerve defects is less than 50%, the doctor may initially think that the patient is normal. When the doctor sees that the cup-to-disc ratio does not fall within the range of normal human eyes, and the probability of optic nerve defects is less than 50%, the doctor may initially think that the patient is suspected of benign glaucoma. When the doctor sees that the cup-to-disc ratio does not fall within the range of the normal human eye, and the probability of optic nerve defects is higher than 50%, the doctor may initially think that the patient is malignant glaucoma. The doctor will think that the patient needs to take the ophthalmological optical coherent tomography, and then the doctor determines whether the diagnosis is confirmed based on the tomogram. In this way, the image processing system and the image processing method can generate a lot of information, integrating the probability of optic nerve defects and the cup-to-disc ratio to help doctors assess the severity of glaucoma in patients.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
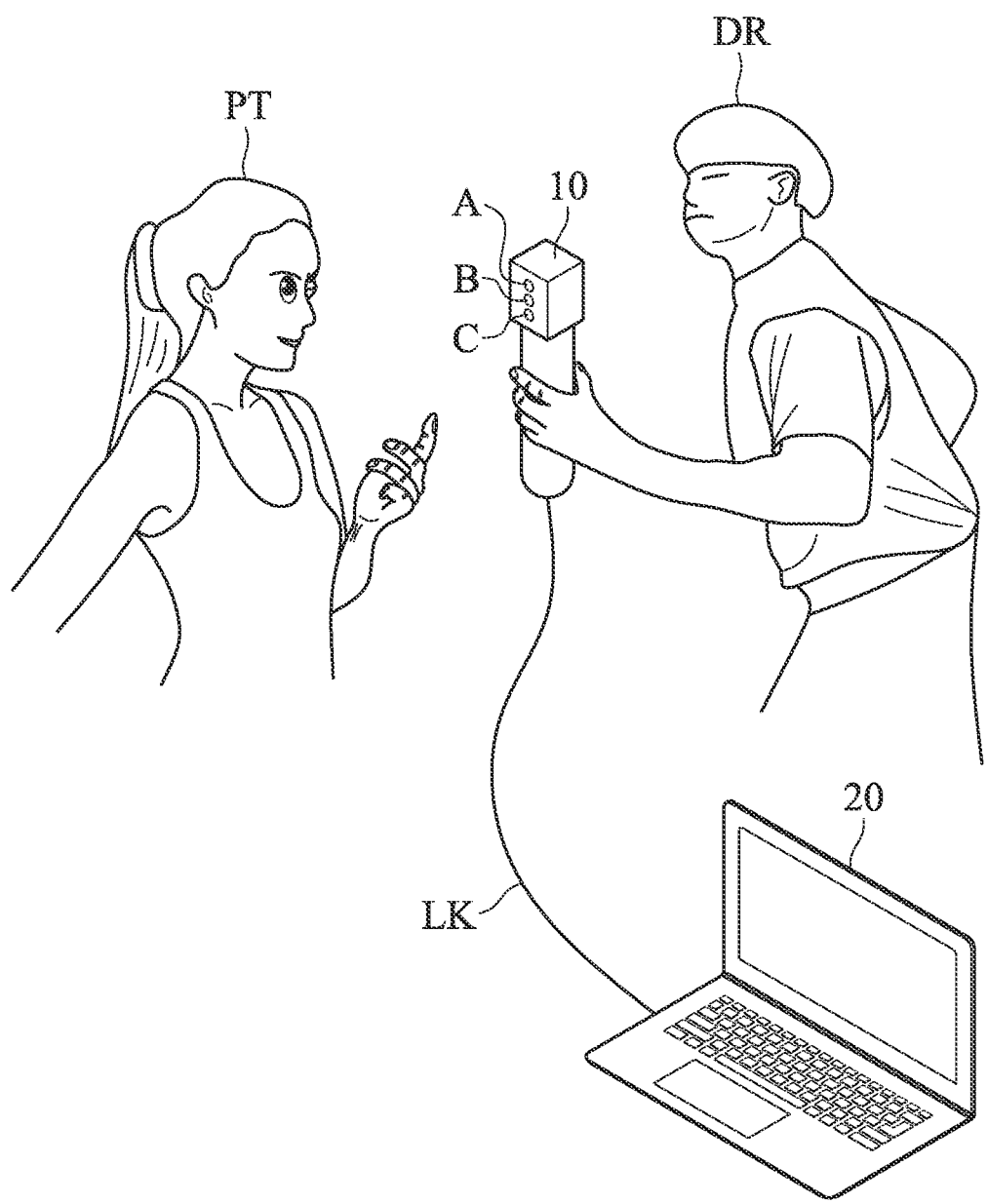
FIG. 1 is a block diagram of an image processing system according to an embodiment of the present invention.
Figure 2:
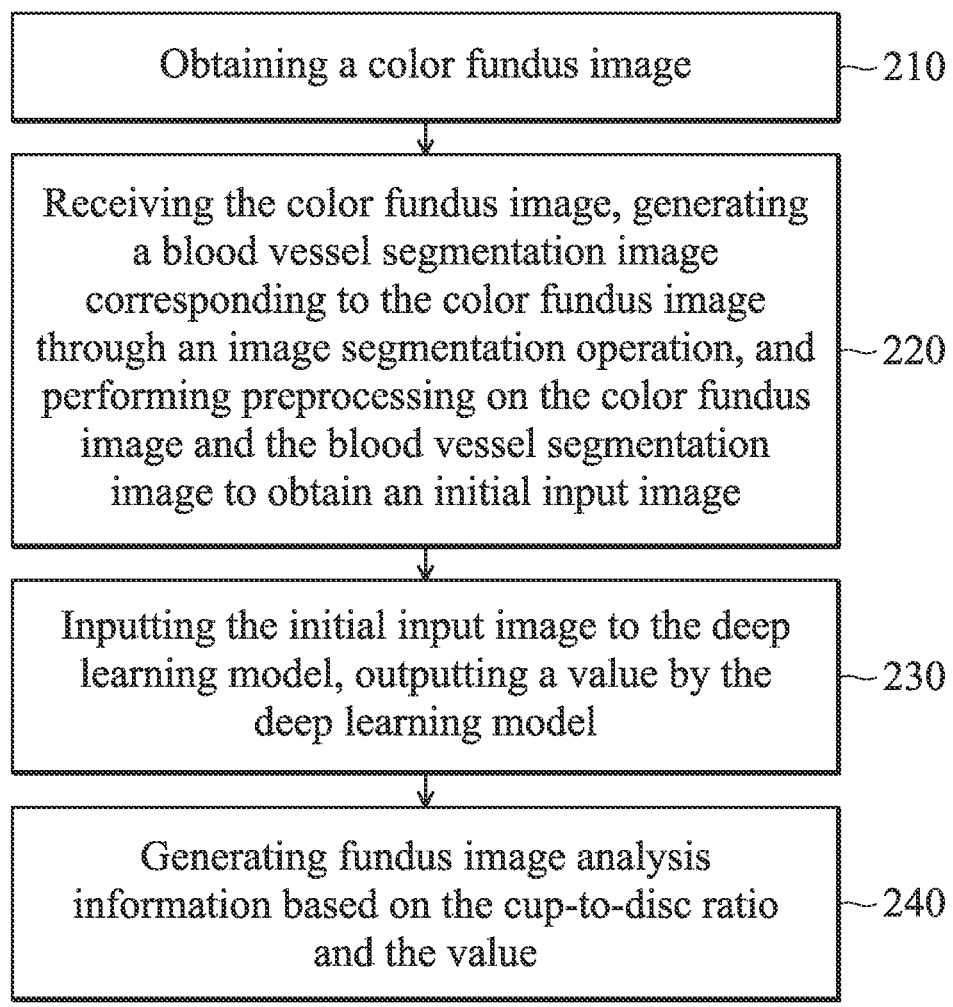
FIG. 2 is a schematic diagram of an image processing method according to an embodiment of the invention.
Figure 3:
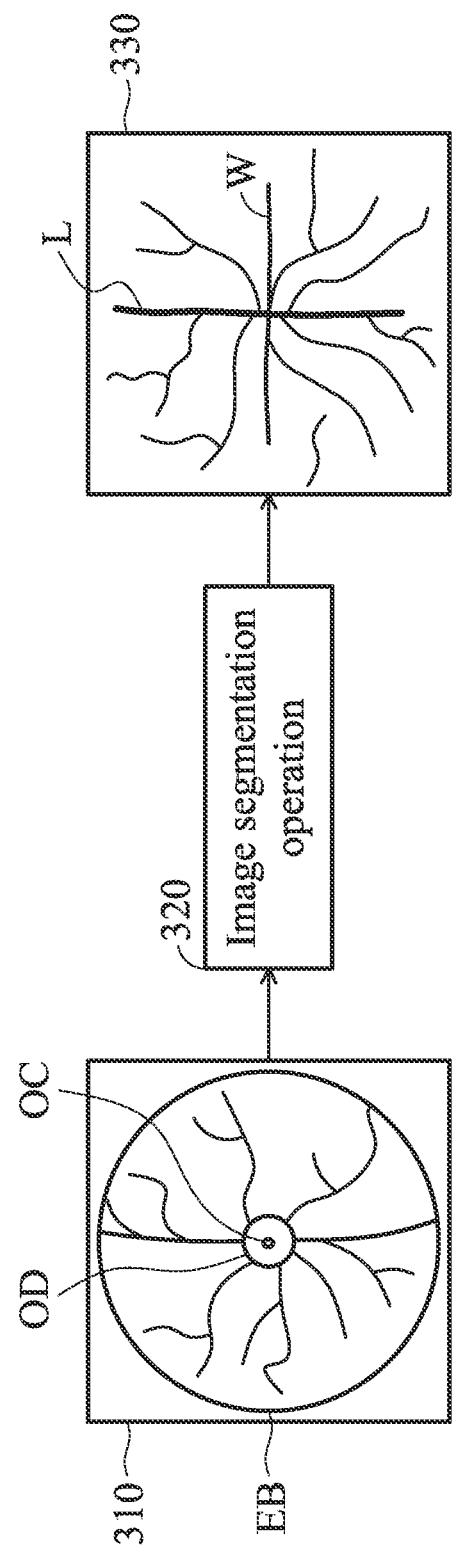
FIG. 3 is a schematic diagram illustrating a method of generating a blood vessel segmentation image according to an embodiment of the present invention.

Please refer to FIGS. 1 to 3. FIG. 1 is a block diagram of an image processing system 100 according to an embodiment of the present invention. FIG. 2 is a schematic diagram of an image processing method 200 according to an embodiment of the invention. FIG. 3 is a schematic diagram illustrating a method of generating a blood vessel segmentation image 330 according to an embodiment of the present invention.

As shown in FIG. 1, the image processing system 100 includes an ophthalmoscope device 10 and a processor 20.

In one embodiment, the ophthalmoscope device 10 is used to obtain a color fundus image.

In one embodiment, the ophthalmoscope device 10 can be a direct ophthalmoscope or an indirect ophthalmoscope. Taking a direct ophthalmoscope as an example, the ophthalmoscope device 10 can directly inspect the fundus without dilating pupils. The examination is performed in a dark room, and the doctor DR takes the ophthalmoscope device 10 to the right or left eye close to the patient PT. The front of the ophthalmoscope device 10 is in contact with the patient PT, the front eye opening A is used to align the eyes of the patient, and the light color knob B is used to emit light. In some examples, the light color knob B allows the doctor DR to choose to make the front of the ophthalmoscope device 10 emit green light, white light or polarized light. Green light is used to observe vascular omental bleeding, white light is used for general inspection, and polarized light is used to eliminate corneal reflections. After the corneal reflection is eliminated, it is easier to observe the fundus. The steel ring knob C allows the doctor DR to choose a small aperture, a large aperture, a blue aperture, etc. on the front of the ophthalmoscope device 10. A small aperture is used for small pupils, a large aperture is used for large pupils, and a blue aperture is used for fluorescent dyeing.

The back side of the ophthalmoscope device 10 faces the doctor DR. Some ophthalmoscope devices 10 have a display on the back side. The doctor DR can directly see the fundus of the patient's PT from the display. In one embodiment, the ophthalmoscope device 10 is a digital fundus camera. Generally, a digital camera with more than 2 million pixels can be used to obtain a high-definition fundus image, such as the color fundus image 310 in FIG. 3. The digital camera is connected with the dedicated interface of the fundus camera to take the required fundus image, and then send it to the computer system through the data transmission link LK for image analysis, storage and printing. In one embodiment, the processor 20 is responsible for receiving a color fundus image and performing image analysis.

In one embodiment, the fundus image captured by the ophthalmoscope device 10 (i.e., the color fundus image 310) can be transmitted to the computer system by wired or wireless transmission.

However, there are many styles and models of the ophthalmoscope device 10 on the market. This is just an example. Any ophthalmoscope device that can take a color fundus image can be applied to the embodiments.

In one embodiment, the processor 20 can be located in a notebook computer, desktop computer, tablet, mobile phone or other electronic device. In one embodiment, the processor 30 can be implemented as, for example, a microcontroller, a microprocessor, a digital signal processor, an application specific integrated circuit (ASIC) or a logic circuit.

The image processing method 200 is described below, and the image processing method 200 can be implemented by the image processing system 100.

In step 210, the ophthalmoscope device 10 obtains a color fundus image 310.

In one embodiment, the color fundus image 310 will be an image of the eyeball EB. The eyeball EB image is generally red (or similar colors such as red and orange). The optic disc OD and the optic cup OC shows slightly different color areas (for example, yellow).

More specifically, the doctor DR uses the ophthalmoscope device 10 to look into the fundus, and can see a structure similar to a disc, which is medically called the optic disc OD. This refers to the part where the optic nerve penetrates the eyeball from behind the eyeball. Clinically this is the root of the optic nerve. That is, the optic nerve fibers in this part radiate around 360 degrees like an umbrella (the optic nerve fibers are the part of the color fundus map 310 that is expanded from the optic disc OD net and may have branches), forming the retina. The optic disc OD will form a depression in the center. Because it is shaped like a cup, it is called optic cup OC. The so-called cup-to-disc ratio (CDR) refers to the doctor's DR looking into the fundus, like looking down at a cup on a plate. The ratio of the diameter of the optic cup OC to the optic disc OD is called the cup-to-disc ratio. Generally, the ratio of the cup-to-plate ratio is about less than 0.3. It will be detailed later.

In step 220, the processor 20 receives the color fundus image 310, and generates a blood vessel segmentation image 330 corresponding to the color fundus image 310 through an image segmentation operation 320, and performs preprocessing on the color fundus image 310 and the blood vessel segmentation image 330 to obtain an initial input image 410.

In one embodiment, the image segmentation operation 320 can be implemented by a computer vision algorithm or a deep learning model The computer vision algorithms or deep learning models (for example, convolutional neural network, U-Net model) can be implemented using existing methods.

Please refer to FIG. 3, after the processor 20 receives the color fundus image 310, the processor 20 needs to segment the blood vessels from the color fundus image 310. The processor 20 generates a blood vessel segmentation image 330 that corresponds to the color fundus image 310 through the image segmentation operation 320 (computer vision algorithm or deep learning model). In other words, the processor 20 filters out images other than blood vessels in the color fundus image 310 to generate a blood vessel segmentation image 330.

In one embodiment, the blood vessel segmentation image 330 is a gray scale image, and the preprocessing refers to overlapping the color fundus image 310 and the blood vessel segmentation image 330 to obtain the initial input image 410.

In one embodiment, after the processor 20 filters out the red color in the color fundus map 310, and then overlaps the red-filtered color fundus image 310 and the blood vessel segmentation image 330.

In one embodiment, the processor 20 selects the thickest blood vessel image L in the blood vessel segmentation image 330 to determine the long axis of the optic disc image, and selects the next thickest blood vessel image W perpendicular to the long axis to determine the short axis of the optic disc image. The long axis of an optic cup image is parallel to the long axis of the optic disc image, and the short axis of an optic cup image is parallel to the short axis of the optic disc image. The processor 20 uses an ellipse fitting algorithm to crop the optic disc image according to the long axis of the optic disc image and the short axis of the optic disc image. The processor 20 uses the ellipse fitting algorithm to crop the optic cup image according to the long axis of the optic cup image and the short axis of the optic cup image. The optic disc image will be described in detail later.

In step 230, the processor 20 inputs the initial input image 410 to the deep learning model, and the deep learning model outputs a value.

In one embodiment, the deep learning model can be a neural network, such as a convolutional neural network.

Figure 5:
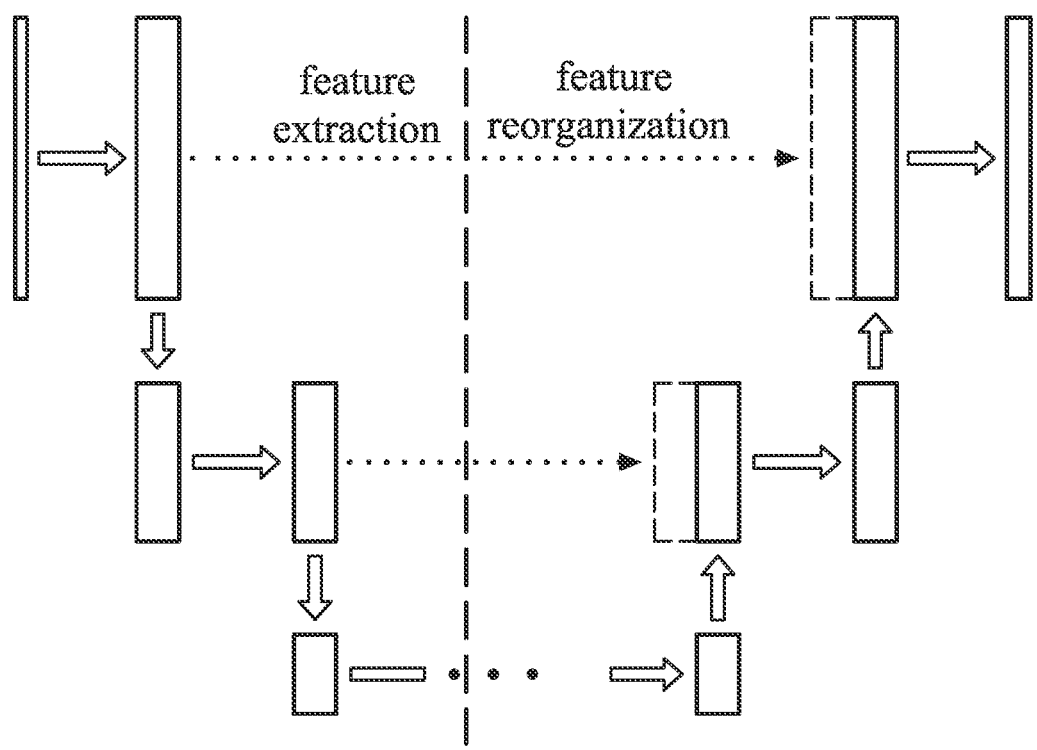
FIG. 5 is a schematic diagram of a U-Net deep learning segmentation network according to an embodiment of the present invention.

In one embodiment, the deep learning model can apply U-Net deep learning segmentation network. Please refer to FIG. 5. FIG. 5 is a schematic diagram of a U-Net deep learning segmentation network according to an embodiment of the present invention. FIG. 5 is a simplified version of U-Net deep learning segmentation network, which is only used to illustrate the concept of U-Net deep learning segmentation network. During implementation, the parameters in the U-Net deep learning segmentation network can be adjusted according to the accuracy of the output results. U-Net deep learning segmentation network is a network commonly used for image segmentation in medical images. In one embodiment, the U-Net deep learning segmentation network route is formed by the contracting path on the left side and the expansive path on the right side, and the 2×2 max pooling method is used on the left side for down sample. The amount of data extracted from the original image is represented by a rectangle, so it can see that the area of the rectangle is getting smaller and smaller. On the right side, it uses of 2×2 up-convolution for up-sampling, and then concatenate low-depth feature tensors of the same dimension. Therefore, it can see that the rectangle representing the amount of data becomes larger and larger, and finally the segmentation image is output. This is just an example. U-Net deep learning segmentation network can have many variations. The parameters of the U-Net deep learning segmentation network can be adjusted or the parameters (for example, the multiple features captured by the U-Net deep learning segmentation network when reducing pixel sampling) can be taken out for other applications according to the actual implementation.

In one embodiment, in step 230, some parameters in the U-Net deep learning segmentation network are taken out for application. For example, the processor 20 forms a neural network with multiple features extracted by the U-Net deep learning segmentation network to determine whether the initial input image 410 is normal.

Figure 4:
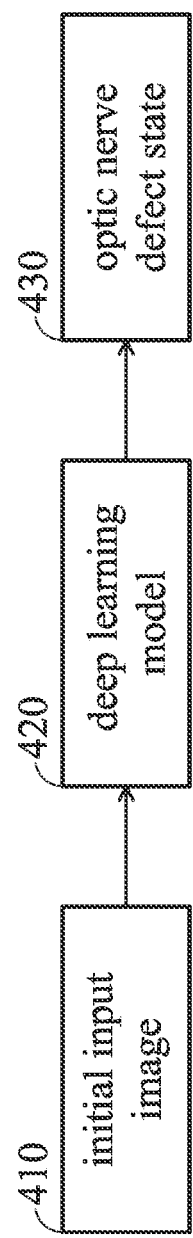
FIG. 4 is a schematic diagram illustrating an evaluation method of the optic nerve defect state according to an embodiment of the present invention.

Please refer to FIG. 4, FIG. 4 is a schematic diagram illustrating an evaluation method of the optic nerve defect state 430 according to an embodiment of the present invention. In one embodiment, the processor 20 inputs the initial input image 410 to a deep learning model 420. The deep learning model 420 outputs the optic nerve defect state 430. The optic nerve defect state 430 can be a numerical value representing the probability. The larger the value, the greater the probability of optic nerve defect, and the smaller the value, the lower the probability of optic nerve defect. However, the definition of the value here is only an example. In one embodiment, the optic nerve defect state 430 outputted by the deep learning model 420 frames the defect location or marks the area, after which the processor 20 can determine the defect state. For example, the processor 20 calculates the ratio of the defect area to the overall initial input image 410 or determines whether the defect location is at the terminal of the optic nerve or the root of the optic nerve.

In one embodiment, the processor 20 inputs the initial input image 410 into a neural network, and the neural network outputs values. The neural network classifies the multiple features extracted by the untrained U-Net deep learning segmentation network, and then the multiple features after classification are combined into the neural network. The processor 20 inputs the initial input image 410 to the neural network, and the neural network outputs values.

In one embodiment, the processor 20 takes out the multiple features extracted by the untrained U-Net deep learning segmentation network when reducing pixel sampling, classifies these features, and then combines the classified features into the neural network. In addition, the processor 20 inputs the initial input image 410 into this neural network, and the neural network outputs values.

In one embodiment, the processor 20 inputs the initial input image 410 into a neural network, and the neural network outputs values. The neural network takes out the multiple features extracted by the trained U-Net deep learning segmentation network, fixes the weighting of each of these features, and adjusts the weighting of the fully connected layer to generate a neural network. In addition, the processor 20 inputs the initial input image 410 into this neural network, and the neural network outputs values.

In step 240, the processor 20 generates fundus image analysis information based on the cup-to-disc ratio and the value.

In one embodiment, the processor 20 is further used to determine whether the value is greater than a threshold (for example, 0.5, which is a probability value of 50%). If the value is greater than the threshold, the color fundus image 310 is regarded as abnormal. If the value is not greater than the threshold, the color fundus image 310 is regarded as normal. Therefore, the fundus image analysis information includes the information that the color fundus image 310 is normal or abnormal. The color fundus image 310 is normal, which represents that the nerve fibers in the color fundus image 310 are normal. In addition, the color fundus image 310 is abnormal, which represents the nerve fiber defect existing in the color fundus image 310.

Figure 6:
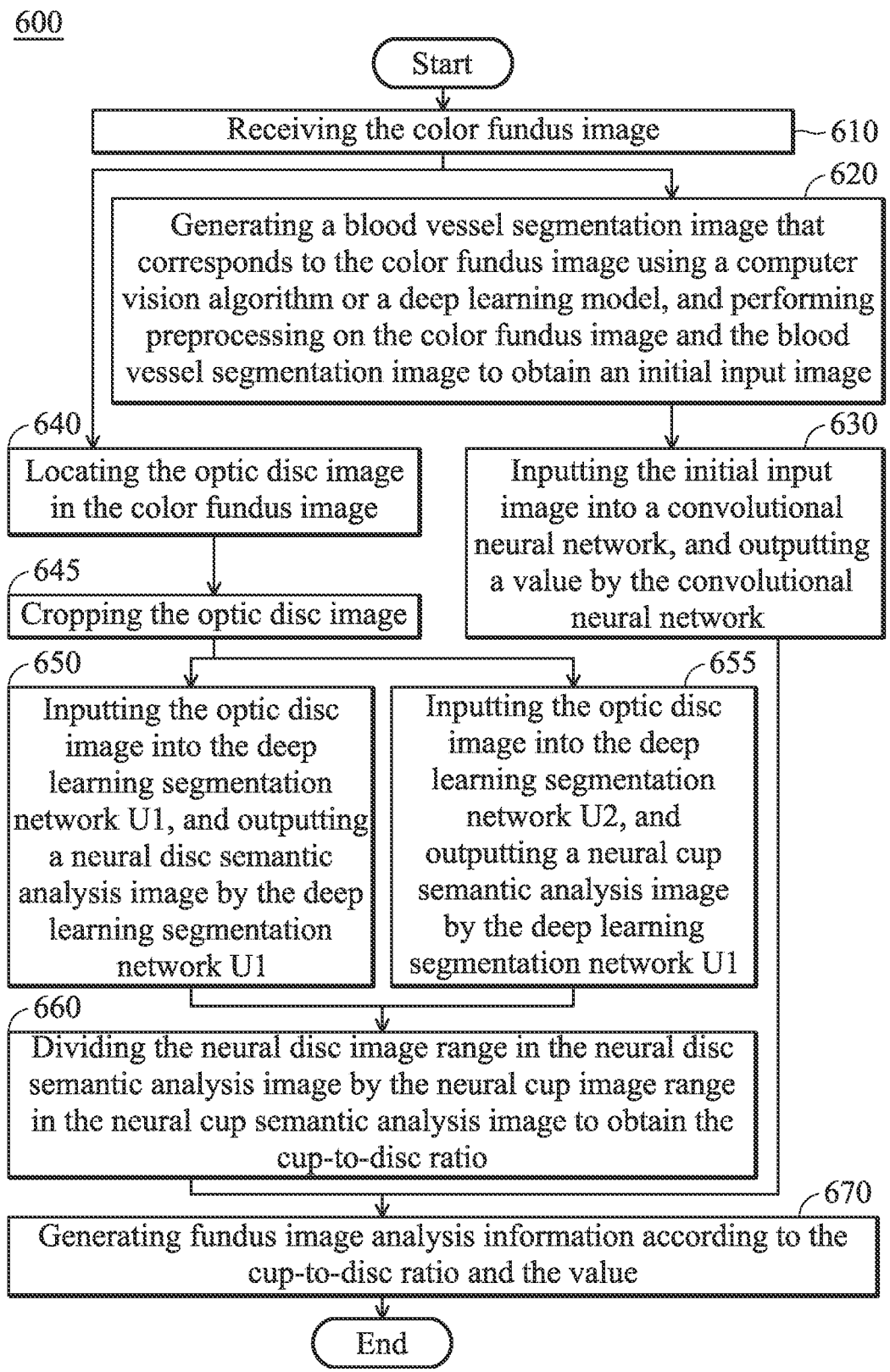
FIG. 6 is a flowchart of an image processing method according to an embodiment of the present invention.

Please refer to FIG. 6, FIG. 6 is a flowchart of an image processing method 600 according to an embodiment of the present invention. Steps 620 and 640 can be processed in parallel and sequentially, and there is no certain processing sequence. Steps 650 and 655 can be processed in parallel and sequentially, and there is no certain processing sequence. After steps 660 and 630 are completed, step 670 is performed.

In step 610, the processor 20 receives the color fundus image 310.

In step 620, the processor 20 generates a blood vessel segmentation image 330 that corresponds to the color fundus image 310 using a computer vision algorithm or a deep learning model, and performs preprocessing on the color fundus image 310 and the blood vessel segmentation image 330 to obtain an initial input image 410.

In step 630, the processor 20 inputs the initial input image 410 into a convolutional neural network, and the convolutional neural network outputs a value.

Figure 7:
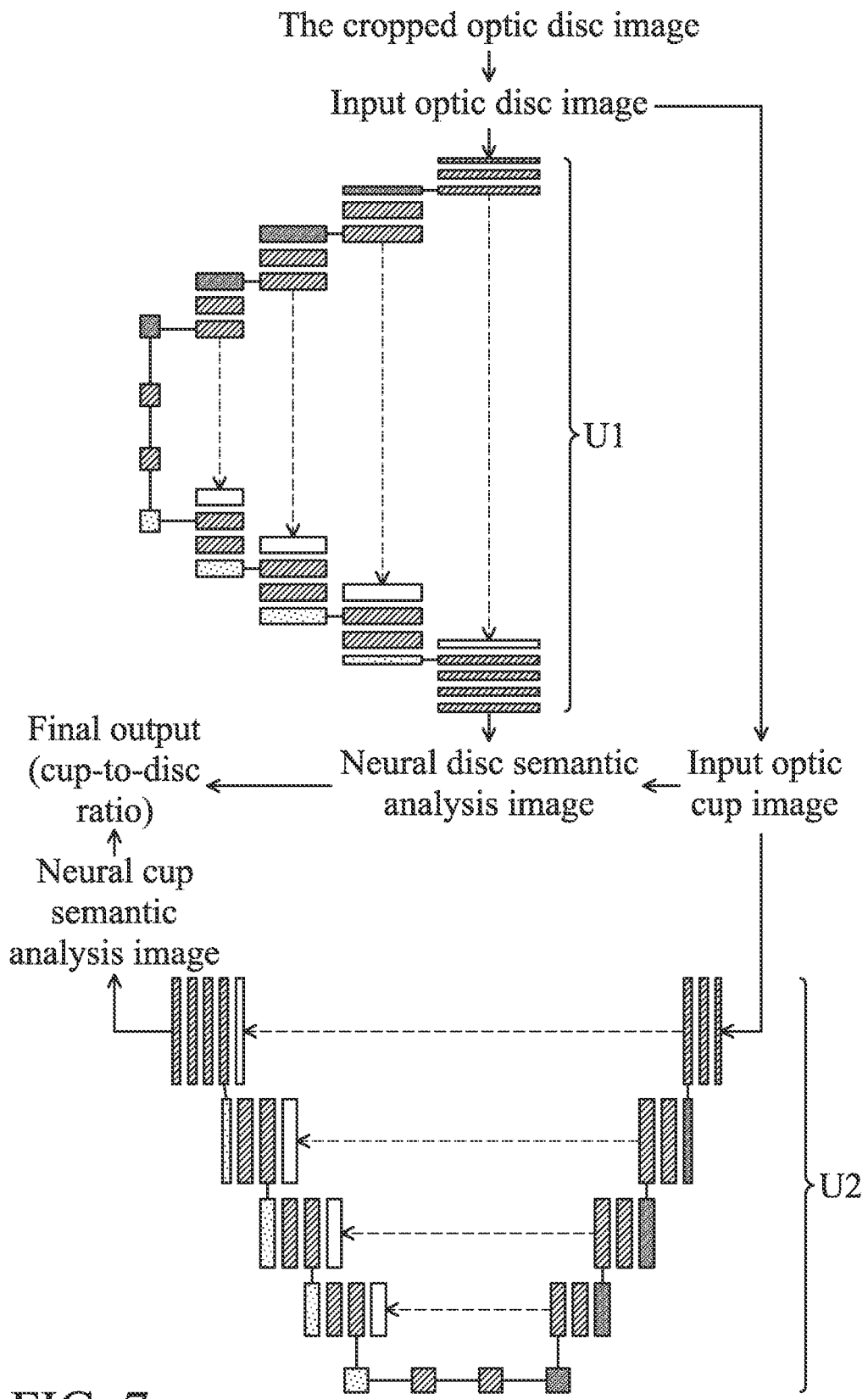
FIG. 7 is a schematic diagram of an optic nerve cup and disc system model according to an embodiment of the present invention.
Figure 8:
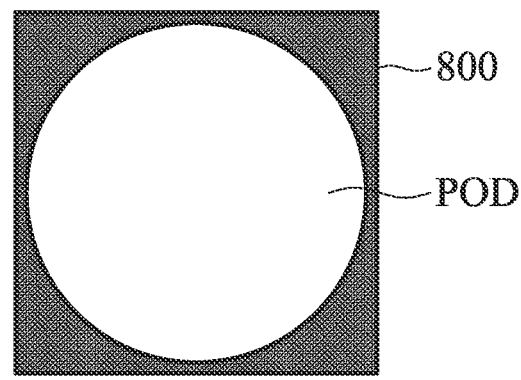
FIG. 8 is a schematic diagram of a neural disc semantic analysis image according to an embodiment of the present invention.
Figure 9:
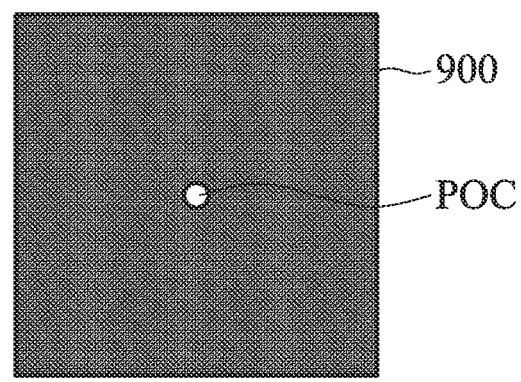
FIG. 9 is a schematic diagram of a neural cup semantic analysis image according to an embodiment of the present invention.

Please refer to FIG. 6 and FIGS. 7-9 together. FIG. 7 is a schematic diagram of an optic nerve cup and disc system 700 model according to an embodiment of the present invention. FIG. 8 is a schematic diagram of a neural disc semantic analysis image according to an embodiment of the present invention. FIG. 9 is a schematic diagram of a neural cup semantic analysis image according to an embodiment of the present invention. The method of generating the cup-to-disc ratio is described in detail below, namely steps 640 to 670.

In one embodiment, the processor 20 locates the optic disc image in the color fundus image 310 (step 640). The processor 20 crops the optic disc image (step 645). The processor 20 inputs the cropped optic disc image into the optic disc system.

In one embodiment, such as the blood vessel segmentation image 330 shown in FIG. 3, in this step, the processor 20 selects the thickest blood vessel image in the blood vessel segmentation image 330 to determine the long axis of the optic disc image, and selects the next thickest blood vessel image perpendicular to the long axis to determine the short axis of the optic disc image. The processor 20 uses an ellipse fitting algorithm to crop the optic disc image according to the long axis of the optic disc image and the short axis of the optic disc image. In one embodiment, the processor 20 can roughly circle the optic disc image range using the long axis, the short axis of the optic disc image, and the ellipse fitting algorithm. The processor 20 can find the smallest square that selects the optic disc image range. When cropping, the processor 20 can enlarge the horizontal axis and vertical axis of the smallest square a little bit more (for example, 5 pixels on the left and right sides of the horizontal axis, and 5 pixels on the top and bottom of the vertical axis) to crop the enlarged square. The square is large enough to ensure that the whole optic disc image is in range.

In one embodiment, the processor 20 inputs the optic disc image into the deep learning segmentation network U1, and the deep learning segmentation network U1 outputs a neural disc semantic analysis image 800 (step 650).

Please refer to FIG. 8. The neural disc semantic analysis image 800 is a grayscale image, and the white area in it represents the neural disc image range POD. In one embodiment, the deep learning segmentation network U1 is a U-Net deep learning segmentation network. After the processor 20 inputs the optic disc image into the U-Net deep learning segmentation network, in the neural disc semantic analysis image 800 outputted by the U-Net deep learning segmentation network, the neural disc image range POD is white, and the rest is black.

In one embodiment, the processor 20 inputs the optic disc image into the deep learning segmentation network U2, and the deep learning segmentation network U2 outputs a neural cup semantic analysis image 900 (step 655).

Please refer to FIG. 9. The neural cup semantic analysis image 900 is a gray-scale image, and the white area in it represents the neural cup image range POC. In one embodiment, the deep learning segmentation network U2 is another U-Net deep learning segmentation network. After the processor 20 inputs the optic disc image into another U-Net deep learning segmentation network, in the neural disc semantic analysis image 800 outputted by the another U-Net deep learning segmentation network, the neural cup image range POC is white, and the rest is black.

In one embodiment, after the processor 20 crops the optic disc image (step 645), the center point of the optic disc image is regarded as the origin, and a polar coordinate conversion is performed to generate a polar coordinate converted optic disc image. The processor 20 inputs the polar coordinate converted optic disc image into the deep learning segmentation network U1, and the deep learning segmentation network U1 outputs the neural disc semantic analysis image 800 (step 650). The processor 20 inputs the polar coordinate converted optic disc image into the deep learning segmentation network U2, and the deep learning segmentation network U2 outputs the neural cup semantic analysis image (step 655). Since the polar coordinate converted optic disc image is a bar graph, the deep learning segmentation network U1 and U2 are better at recognizing bar graphs than recognizing circular graphs. Therefore, the polar coordinate converted optic disc image can improve the recognition accuracy of the deep learning segmentation network U1 and U2.

In one embodiment, the cropped optic disc image, neural disc semantic analysis image 800, and neural cup semantic analysis image 900 have the same dimensions. The input of the deep learning segmentation network U1 and U2 are all the same cropped optic disc image. The deep learning segmentation network U1 outputs a neural disc semantic analysis image 800, and the deep learning segmentation network U2 outputs a neural cup semantic analysis image 900.

In step 660, the processor 20 divides the white area in the neural disc semantic analysis image 800 (i.e., the neural disc image range POD) by the white area in the neural cup semantic analysis image 900 (i.e., the neural cup image range POC) to obtain the cup-to-disc ratio (CDR).

In step 670, the processor 20 generates fundus image analysis information according to the cup-to-disc ratio and the value.

In one embodiment, the fundus image analysis information includes cup-to-disc ratio, whether the cup-to-disc ratio is within the range of a normal human eye, whether the optic nerve fiber is defective (optical nerve fiber is normal or abnormal), etc.

The image processing system and image processing method shown in the present invention can analyze the color fundus images to calculate the cup-to-disc ratio and the probability of optic nerve defects, and use the fundus image analysis information to assist doctors in the use of color fundus images for glaucoma judgment. For example, when the doctor sees that the cup-to-disc ratio falls within the range of normal human eyes, and the probability of optic nerve defects is less than 50%, the doctor may initially think that the patient is normal. When the doctor sees that the cup-to-disc ratio does not fall within the range of normal human eyes, and the probability of optic nerve defects is less than 50%, the doctor may initially think that the patient is suspected of benign glaucoma. When the doctor sees that the cup-to-disc ratio does not fall within the range of the normal human eye, and the probability of optic nerve defects is higher than 50%, the doctor may initially think that the patient is malignant glaucoma. The doctor will think that the patient needs to take the ophthalmological optical coherent tomography, and then the doctor determines whether the diagnosis is confirmed based on the tomogram. In this way, the image processing system and the image processing method can generate a lot of information, integrating the probability of optic nerve defects and the cup-to-disc ratio to help doctors assess the severity of glaucoma in patients.

The method of the present invention, or a specific type or part thereof, can exist in the form of code. The code can be contained in physical media, such as floppy disks, CDs, hard disks, or any other machine-readable (such as computer-readable) storage media, or not limited to external forms of computer program products. When the program code is loaded and executed by a machine, such as a computer, the machine becomes a device for participating in the present invention. The code can also be transmitted through some transmission media, such as wire or cable, optical fiber, or any transmission type. When the code is received, loaded and executed by a machine, such as a computer, the machine becomes used to participate in this Invented device. When implemented in a general-purpose processing unit, the program code combined with the processing unit provides a unique device that operates similar to the application of specific logic circuits.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but are to be accorded the widest scope consistent with the principles and novel features disclosed herein.

What is claimed is:

1. An image processing system, comprising:
   an ophthalmoscope device, configured to obtain a color fundus image; and
   a processor, configured to receive the color fundus image, generate a blood vessel segmentation image corresponding to the color fundus image using a computer vision algorithm or a deep learning model, overlap the color fundus image and the blood vessel segmentation image to obtain an initial input image, and input the initial input image into a convolutional neural network, and the convolutional neural network outputs a value representing a probability of optic nerve defect;
   wherein the processor generates fundus image analysis information according to the cup-to-disc ratio and the value.

2. The image processing system as claimed in claim 1, wherein the processor is further used to determine whether the value is greater than a threshold, and if the value is greater than the threshold, the color fundus image is regarded as abnormal, and if the value is not greater than the threshold, the color fundus image is regarded as normal.

3. The image processing system as claimed in claim 1, wherein the processor locates an optic disc image in the color fundus image, crops the optic disc image, and inputs the optic disc image into a first deep learning segmentation network, the first deep learning segmentation network outputs a neural disc semantic analysis image, and inputs the optic disc image into a second deep learning segmentation network, the second deep learning segmentation network outputs a neural cup semantic analysis image, and divides the white area in the neural disc semantic analysis image by the white area in the neural cup semantic analysis image to obtain the cup-to-disc ratio.

4. The image processing system as claimed in claim 3, wherein the first deep learning segmentation network is a first U-Net deep learning segmentation network, and when the processor inputs the optic disc image into the first U-Net deep learning segmentation network, in the neural disc semantic analysis image outputted by the first U-Net deep learning segmentation network, the optic disc image range is white, and all other parts are black;
   the second deep learning segmentation network is a second U-Net deep learning segmentation network, wherein when the processor inputs the optic disc image into the second U-Net deep learning segmentation network, in the neural cup semantic analysis image outputted by the second U-Net deep learning segmentation network, an optic cup image range is white, and all other parts are black;
   wherein the dimensions of the optic disc image, the neural disc semantic analysis image, and the neural cup semantic analysis image are the same.

5. The image processing system as claimed in claim 1, wherein the blood vessel segmentation image is a grayscale image.

6. The image processing system as claimed in claim 5, wherein the processor filters out the red color in the color fundus image, and then overlaps the red-filtered color fundus image and the blood vessel segmentation image.

7. The image processing system as claimed in claim 1, wherein the processor inputs the initial input image into a neural network, and the neural network outputs the value, wherein the neural network classifies a plurality of features extracted from the untrained U-Net deep learning segmentation network, and then the classified features are combined into the neural network.

8. The image processing system as claimed in claim 1, wherein the processor inputs the initial input image into a neural network, and the neural network outputs the value, wherein the neural network takes out a plurality of features extracted by a trained U-Net deep learning segmentation network, fixes a weighting corresponding to each of the features, and then adjusts the weighting of a fully connected layer to generate the neural network.

9. The image processing system as claimed in claim 3, wherein after the processor crops the optic disc image, the center point of the optic disc image is regarded as an origin, and a polar coordinate conversion is performed to generate a polar coordinate converted optic disc image; the processor inputs the polar coordinate converted optic disc image into the first deep learning segmentation network, and the first deep learning segmentation network outputs the neural disc semantic analysis image; and the processor inputs the polar coordinate converted optic disc image into the second deep learning segmentation network, and the second deep learning segmentation network outputs the neural cup semantic analysis image.

10. The image processing system as claimed in claim 1, wherein the processor selects a thickest blood vessel image in the blood vessel segmentation image to determine a long axis of the optic disc image, selects the next thickest blood vessel image perpendicular to the long axis to determine a short axis of the optic disc image, the long axis of an optic cup image is parallel to the long axis of the optic disc image, a short axis of an optic cup image is parallel to the short axis of the optic disc image, the processor uses an ellipse fitting algorithm to crop the optic disc image according to the long axis of the optic disc image and the short axis of the optic disc image, and the processor uses the ellipse fitting algorithm to crop the optic cup image according to the long axis of the optic cup image and the short axis of the optic cup image.

11. An image processing method, comprising:
    obtaining a color fundus image from an ophthalmoscope device; and
    receiving the color fundus image at a processor, generating a blood vessel segmentation image corresponding to the color fundus image using a computer vision algorithm or a deep learning model, and overlapping the color fundus image and the blood vessel segmentation image to obtain an initial input image, inputting the initial input image into a convolutional neural network, and the convolutional neural network outputs a value representing a probability of optic nerve defect;

wherein the processor generates fundus image analysis information according to the cup-to-disc ratio and the value.

12. The image processing method as claimed in claim 11, further comprising:

the processor determines whether the value is greater than a threshold;

wherein if the value is greater than the threshold, the color fundus image is regarded as abnormal, and if the value is not greater than the threshold, the color fundus image is regarded as normal.

13. The image processing method as claimed in claim 11, further comprising:

locating the optic disc image in the color fundus image, and cropping the optic disc image;

inputting the optic disc image into a first deep learning segmentation network, outputting a neural disc semantic analysis image from the first deep learning segmentation network;

inputting the optic disc image into a second deep learning segmentation network, outputting a neural cup semantic analysis image from the second deep learning segmentation network; and dividing the white area in the neural disc semantic analysis image by the white area in the neural cup semantic analysis image to obtain the cup-to-disc ratio.

14. The image processing method as claimed in claim 13, wherein the first deep learning segmentation network is a first U-Net deep learning segmentation network, and when the processor inputs the optic disc image into the first U-Net deep learning segmentation network, in the neural disc semantic analysis image output by the first U-Net deep learning segmentation network, the optic disc image range is white, and all other parts are black;

the second deep learning segmentation network is a second U-Net deep learning segmentation network, and when the processor inputs the optic disc image into the second U-Net deep learning segmentation network, in the neural cup semantic analysis image outputted by the second U-Net deep learning segmentation network, the optic cup image range is white, and all other parts are black;

wherein the dimensions of the optic disc image, the neural disc semantic analysis image, and the neural cup semantic analysis image are the same.

15. The image processing method as claimed in claim 11, wherein the blood vessel segmentation image is a grayscale image.

16. The image processing method as claimed in claim 15, further comprising:

filtering out the red color in the color fundus image and then overlapping the red-filtered color fundus image and the blood vessel segmentation image.

17. The image processing method as claimed in claim 11, further comprising:

inputting the initial input image into a neural network, and outputting the value from the neural network;

wherein the neural network classifies a plurality of features extracted from the untrained U-Net deep learning segmentation network, and then the classified features are combined into the neural network.

18. The image processing method as claimed in claim 11, further comprising:

inputting the initial input image into a neural network, after which the neural network outputs the value;

wherein the neural network takes out a plurality of features extracted by a trained U-Net deep learning segmentation network, fixes the weighting corresponding to each of the features, and then adjusts the weighting of a fully connected layer to generate the neural network.

19. The image processing method as claimed in claim 13, further comprising:

after cropping the optic disc image, regarding the center point of the optic disc image as the origin, and performing a polar coordinate conversion to generate a polar coordinate converted optic disc image;

inputting the polar coordinate converted optic disc image into the first deep learning segmentation network, and outputting the neural disc semantic analysis image from the first deep learning segmentation network; and inputting the polar coordinate converted optic disc image into the second deep learning segmentation network, and outputting the neural cup semantic analysis image from the second deep learning segmentation network.

20. The image processing method as claimed in claim 11, further comprising:

selecting the thickest blood vessel image in the blood vessel segmentation image to determine the long axis of the optic disc image;

selecting the next thickest blood vessel image perpendicular to the long axis to determine the short axis of the optic disc image;

wherein the long axis of an optic cup image is parallel to the long axis of the optic disc image, and the short axis of an optic cup image is parallel to the short axis of the optic disc image;

using an ellipse fitting algorithm to crop the optic disc image according to the long axis of the optic disc image and the short axis of the optic disc image; and using the ellipse fitting algorithm to crop the optic cup image according to the long axis of the optic cup image and the short axis of the optic cup image.

* * * * *